(12) United States Patent
Kropfli et al.

(10) Patent No.: US 6,377,202 B1
(45) Date of Patent: Apr. 23, 2002

(54) ICING HAZARD AVOIDANCE SYSTEM AND METHOD USING DUAL-POLARIZATION AIRBORNE RADAR

(75) Inventors: Robert A. Kropfli, Golden; Roger F. Reinking, Longmont; Bruce W. Bartram; Sergey Y. Matrosov, both of Boulder; Brooks E. Martner, Lafayette, all of CO (US)

(73) Assignees: The United States of America as represented by the Secretary of Commerce, Washington, DC (US); University Technology Corporation, Boulder, CO (US)

( * ) Notice: Subject to any disclaimer, the term of this patent is extended or adjusted under 35 U.S.C. 154(b) by 0 days.

(21) Appl. No.: 09/534,069

(22) Filed: Mar. 24, 2000

(51) Int. Cl.$^7$ ................................................ G01S 13/95

(52) U.S. Cl. ........................ 342/26; 342/27; 342/175; 342/188; 342/195

(58) Field of Search .......................... 342/26, 27, 28, 342/89, 175, 192–197, 188, 90

(56) References Cited

U.S. PATENT DOCUMENTS

| | | | |
|---|---|---|---|
| 3,049,703 A | | 8/1962 | Davis |
| 3,268,891 A | | 8/1966 | Atlas |
| 4,649,388 A | * | 3/1987 | Atlas ............................ 342/26 |
| 4,868,917 A | * | 9/1989 | Woolcock .................... 342/26 |
| RE33,152 E | * | 1/1990 | Atlas ............................ 342/26 |
| 5,028,929 A | | 7/1991 | Sand et al. |
| 5,488,375 A | | 1/1996 | Michie |
| 5,500,646 A | * | 3/1996 | Zrnc .......................... 342/188 |
| 5,568,151 A | * | 10/1996 | Merritt ....................... 342/192 |
| 5,621,410 A | | 4/1997 | Gray et al. |

* cited by examiner

Primary Examiner—Bernarr E. Gregory
(74) Attorney, Agent, or Firm—Ronald F. Sandler

(57) ABSTRACT

An icing hazard avoidance system and method utilizes a forward-looking, single frequency, dual-polarization pulse radar system as well as temperature sensing means to determine if supercooled liquid water (SLW) drops are present in an aircraft's flight path. A processor determines the ratio of co-polarized and cross-polarized returns. This ratio and the temperature of the atmosphere indicate if SLW drops exists. If an icing hazard is determined, an indicator in the cockpit of the aircraft alerts pilots so that avoidance measures may be taken.

13 Claims, 1 Drawing Sheet

ICING HAZARD AVOIDANCE SYSTEM AND METHOD USING DUAL-POLARIZATION AIRBORNE RADAR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates generally to radar systems for determining weather conditions and, more particularly, to an airborne radar system and method for detecting supercooled liquid water drops in the atmosphere.

2. Description of the Prior Art

The task of finding regions within clouds that may present an icing hazard to aircraft requires distinguishing one hydrometeor type from another and estimating their temperature. Hydrometeors are any of the cloud particles composed of liquid water or ice or any of the liquid or ice particles that fall from a cloud as precipitation. In the broadest sense, hydrometeors are therefore of two types, liquid drops and ice crystals.

Liquid water drops form clouds in the atmosphere when the atmosphere becomes saturated with water vapor and it condenses on cloud condensation nuclei. At temperatures between zero and minus forty degrees centigrade, these drops can remain liquid instead of immediately freezing. Liquid water drops at sub-zero temperatures are said to be in a supercooled state. These supercooled liquid water (SLW) drops can grow by continual vapor condensation or by collision and coalescence with one another. SLW drops prevail for minutes to hours, before they eventually evaporate to the vapor phase, freeze to the solid phase, or remain liquid and grow to sufficient size to precipitate.

Clouds, or regions within a cloud, may contain only SLW drops, only ice crystals, or a mixture of both. Because ice crystals are less readily and less abundantly nucleated in the atmosphere than are liquid drops, SLW drops will form more abundantly at all but the coldest temperatures. It is the SLW drops that create the greatest icing hazards. Therefore, when sufficient quantities of SLW drops are in the flight path of an aircraft, the potential for ice accumulation on the aircraft's wings and other surfaces increases. Ice accumulation can reduce lift, increase drag, and even cause an aircraft to stall or lose control. An average of sixty civilian lives are lost per year due to icing related aircraft accidents.

Weather warning radar systems now in operation generally detect only precipitation sized water drops and ice crystals. Such weather radar systems are usually not sensitive enough to detect liquid drops of drizzle sizes and smaller. Furthermore, because they measure only the echo intensity, they cannot distinguish ice crystals from water crystals, except in selected circumstances by uncertain inferences from other weather information. Additionally, weather radar systems in operation usually do not include the ability to determine the temperature of the drops within a cloud. However, two prior art airborne weather radar systems are known which attempt to distinguish SLW drops. One such system utilizes a single frequency radar system of increased sensitivity and a temperature sensor. Another system uses a temperature sensor and a dual frequency radar system in which the returns of the two frequencies are compared and processed to determine the quantity of SLW. This approach requires the use of two radar systems, one transmitting x-band, and another transmitting Ka-band.

While the prior art radar systems discussed above appear to have had the capability to detect SLW, both ground-based and airborne weather detecting radar systems known to be used at this time are subject to the above mentioned deficiencies. As such, these systems do not distinguish among hydrometeor types to differentiate clouds containing hazardous SLW drops from those clouds which do not. A prior art dual-polarization radar system is known that detects potential storm hazards, but is incapable of SLW drop detection. So, while reports are available for pilots' use in navigation, the current weather information available to aircraft pilots is of little or no value for avoiding hazardous icing conditions.

SUMMARY OF THE INVENTION

It is therefore an object of the present invention to provide an improved icing hazard avoidance system and method.

A further object of this invention is to provide an improved icing hazard avoidance system and method wherein both hydrometeor type and cloud temperature are determined simultaneously.

It is another object of the present invention to provide an improved icing hazard avoidance system and method capable of detecting SLW drops sized somewhat smaller to somewhat larger than drizzle size, which are especially hazardous to aircraft.

It is yet another object of the present invention to provide an improved icing hazard avoidance system and method utilizing a generally conventional radar system and a temperature sensing means.

Briefly, these and other objects may be achieved by an airborne radar system which determines the presence of SLW drops by evaluating the ratio of co-polarized and cross-polarized return signals of a dual-polarization radar in combination with the temperature of the cloud or region of cloud being sensed.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
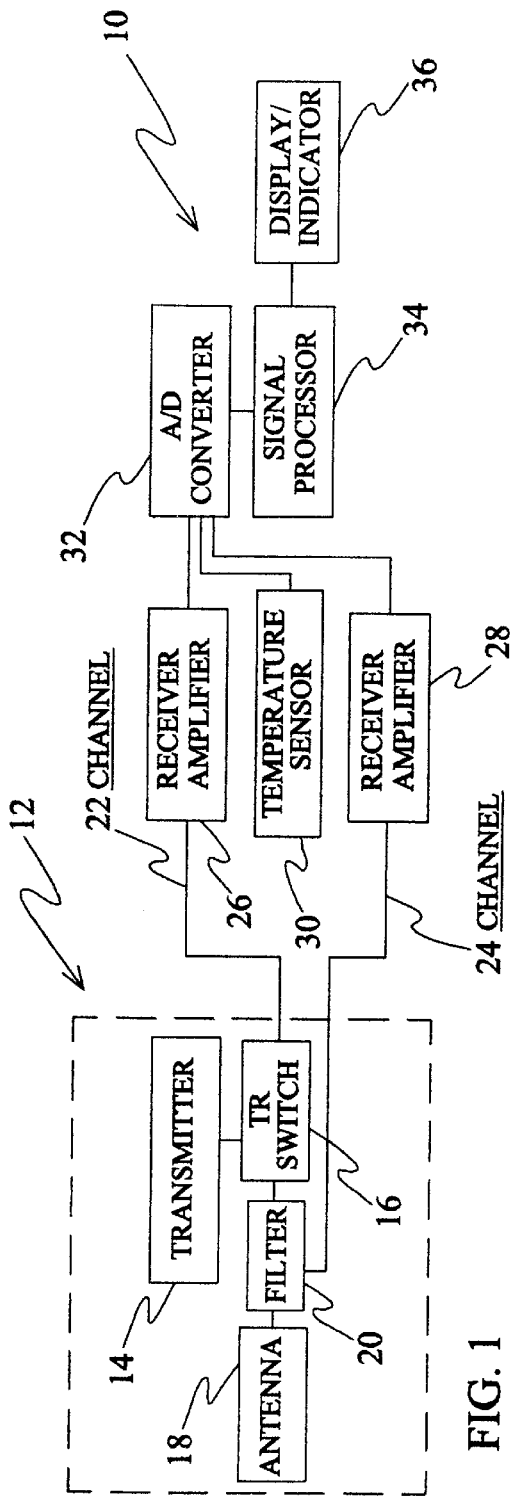
FIG. 1 is a block diagram depicting one embodiment of the icing hazard avoidance system (IHAS) of the present invention utilizing two receiver amplifiers.

With reference to the figures, wherein like reference characters indicate like elements throughout the figures and, in particular, with reference to FIG. 1, IHAS 10 is depicted. IHAS 10 comprises a radar system 12, which includes a transmitter 14, a transmit/receive (TR) switch 16, an antenna 18, and a polarization state separator filter 20. IHAS 10 further includes a receiver comprising two receiver channels 22 and 24, each having one of two identical receiver amplifiers 26 and 28. HAS 10 also includes an in-situ temperature sensor 30, an analog-to-digital converter 32, a digital signal processor 34, and a display/indicator 36.

Radar system 12 is a forward-looking, single-frequency, dual-polarization pulse radar system that transmits radar signals of either circular or 45°-slant linear polarization signals. While signals having polarizations other than circular or 45°-slant linear may used, these polarizations yielded favorable results., The instant invention contemplates the use of polarization states other than exact circular and true slant-45 degree polarization states. The invention is described in terms of linear polarization unless circular polarization is specifically noted.

High sensitivity is desirable and achieved by using a long pulse width, e.g., several microseconds, with corresponding narrow bandwidth. For optimum cloud detection, the Ka-band is recommended, especially at 35 GHz, because of size and weight constraints and a balanced sensitivity to the SLW drops as hereinabove described, although other frequencies in the X-band, e.g., 9.2 GHz, and the W-band, e.g., 95 GHz, might also be useful. Other frequencies may be used as long as they are not subject to atmospheric absorption or insensitivity to such SLW drops. Transmission of the radar beam produced by radar system 12 is directed ahead of the aircraft. One possible scanning mode is in horizontal sectors in front of the aircraft, but a forward-pointing fixed beam is another simpler option, as is scanning through vertical sectors to gain additional information.

In operation, radar system 12 transmits a polarized beam ahead of the aircraft. Hydrometeors within the beam's path depolarize the beam to some extent, and a portion of the beam is reflected back to antenna 18. The reflected signal is then routed from antenna 18 through filter 20, which separates the reflected signals into those that are co-polarized and those that are cross-polarized. The co-polarized signals, also referred to as "main" or "parallel" polarized signals, have the same polarization as the transmitted beam, and the cross-polarized signals, also referred to as orthogonal polarized signals, have a polarization orthogonal to the transmitted beam. When separated by filter 20, one of the separated signals is routed through TR switch 16, and then to channel 22, which is one of two separate channels, 22 and 24, in the receiver section of IHAS 10. The other signal goes directly from filter 20 to channel 24. The magnitudes of the signals outputted from receiver amplifiers 26 and 28, one in each channel, represent the respective power in the co-polarized and cross-polarized channels.

Figure 2:
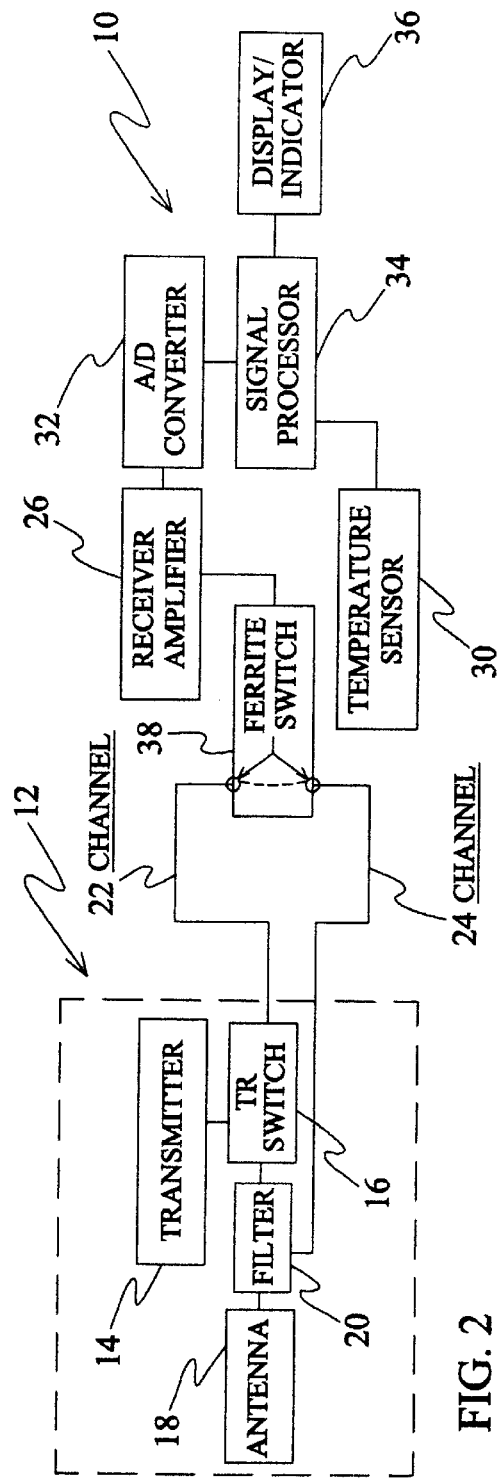
FIG. 2 is a block diagram depicting a second embodiment of the (IHAS) of the present invention utilizing a single receiver amplifier.

FIG. 2 represents an alternative embodiment of the radar system of FIG. 1. The systems are identical except in the receivers. FIG. 2 depicts a system having one receiver amplifier rather than two. Filter 20, as in FIG. 1, divides the co- and cross-polarized signals and imposes them on separate channels 22, 24, but the channels are connected to a ferrite switch 38, which then switches between the channels to a single receiver amplifier 26.

Digital signal processor 34 analyzes the co- and cross-polarized signals outputted from the receiver amplifiers 26, 28, averaging each of these signals over an appropriate dwell time. Processor 34 then calculates the depolarization ratio (DR), the ratio of the signals (which will be discussed later in greater detail) indicating the hydrometeor type, i.e. liquid water or ice crystal. Processor 34 may, if desired, also control antenna 18 by sending control signals to an antenna controller which further causes, by conventional means, antenna 18 to pivot or sweep through horizontal or vertical sectors. Processor 34 obtains antenna angular information that is inputted into display/indicator 36, which may be a typical radar imaging display such as a plane position indicator (PPI) or range-height-indicator (RHI). These indicators respectively display horizontal or vertical sectors in front of the aircraft. With the antenna angular information and the received radar signals, the locations of hydrometeors, which may be hazardous SLW drops, are displayed in the aircraft cockpit. A simplified one dimensional range position indicator (RPI) is an option if the radar beam is not scanned. In such a case, antenna angular information is not considered.

To determine if the detected, potentially hazardous drops are supercooled, the ambient temperature outside the aircraft is measured by sensor 30. The measured temperature is generally the same at the same altitude within the cloud ahead of the aircraft. However, a small correction based on the moist adiabatic lapse rate, which is the typical vertical temperature gradient in a cloud, can be applied to estimate the temperature horizontally ahead of the aircraft if the radar beam is not transmitted horizontally. Information from sensor 30, the moist adiabatic lapse rate, and the pitch angle of the aircraft are inputted to processor 34 to estimate the temperature of the clouds ahead of the aircraft at its flight altitude and possibly at a different altitude. If the estimated cloud temperature is insufficiently cold to create SLW conditions, processor 34 will not signal an indication of a hazardous condition. Normally, insufficient SLW occurs below −25° C. to cause hazardous icing, but a margin of safety can be provided by sensing the temperature to −40° C.

Accordingly, for the direction of interest, normally the flight path of the aircraft, processor 34 is designed to determine whether the estimated temperature is within the hazardous temperature range, i.e., about −25° C. to 0° C., and whether the DR is within predetermined limits that indicate SLW drops that could create an icing hazard. The combination of these two sources of data determines whether or not an icing hazard is present. More specifically, when processor 34 determines that the temperature ahead of the aircraft is within the hazardous range and the DR is within a range indicating the potential for SLW drops, a signal is sent to display/indicator 36. The signal contains information which is interpreted by the display/indicator to indicate an icing hazard. The signal also contains information which indicator/display 36 interprets, to display or otherwise indicate the size and location of the regions of SLW drops ahead of the aircraft which could create the hazard. The information may be displayed in a RPI PPI and/or RHI formats.

As previously discussed, the ability to detect regions in clouds containing SLW drops is of paramount importance to identifying a potential icing hazard for aircraft. As such, it is necessary to distinguish one type of hydrometeor from another. The present invention utilizes a forward-looking, dual-polarization radar system 12 of appropriate frequency, sensitivity, and polarization state, and an in-situ temperature sensor 30, to distinguish hazardous SLW drops from ice crystals and liquid water that do not pose a hazard. The invention is based on the principle that hazardous SLW drops have a depolarization signature that is identifiably different from that of non-hazardous ice particles that do not substantially collect on the aerodynamic surfaces of an aircraft. The depolarization parameter exploited by this invention is the depolarization ratio (DR), which is the ratio of the signal power received in one polarization channel to the signal power received in its orthogonal component. Thus, the general definition for DR is as follows:

$$DR = 10 \text{ Log } (P_{cr}/P_{co}) \qquad \text{Equation 1}$$

Where $P_{cr}$, is the power received in the cross-polarized, or perpendicular channel, and $P_{co}$ is the power received in the co-polarized channel.

Ultimately the magnitude of DR must be determined. The magnitude of DR at any given time is dependent on the polarization of the transmitted signal and the sphericity, density, and orientation of the cloud hydrometeors in the flight path. For a signal transmitted from radar system 12, the reflection from spherical or nearly spherical particles, i.e. liquid drops, whether they be SLW or not, will be of the same polarization as that transmitted. In other words, the signal is not depolarized by spherical hydrometeors, so the reflection received at the radar will contain power predominantly in the co-polarized channel, the co-polarized signals having the same polarity as the signals being transmitted. Negligible power will be received in the cross-polarized channel. Hydrometeors of shapes other than spherical, particularly ice crystals, will generate a DR signal with values indicating considerable depolarization, i.e., substantial power will be found in the cross-polarized channel.

The DR observed from non-spherical, oriented hydrometeors is also affected by the angle of incidence of the transmitted signal, which is determined by the radar's elevation angle relative to horizontal. For spherical hydrometeors only, the measured depolarization signal is independent of the radar's elevation angle. The difference between the DR signature of non-depolarizing spheres and depolarizing ice crystals is substantial and optimized when the elevation angle is near horizontal, which is typically the pointing angle of an airborne forward pointing IHAS radar.

It was further found that the optimum polarization state to be utilized by the IHAS is not necessarily horizontal. The preferred states are either circular or slanted. It should be recognized that other states may be used effectively. However, the circular and slanted states were found to produce greater contrast between hazardous SLW drops and non-hazardous ice particles, offering a means to unambiguously distinguish hazardous from non-hazardous clouds.

Circular polarization requires a radar system capable of transmitting either right or left handed circular polarization, and receiving signals of both right and left-handed polarization. The circular depolarization ratio when, for example, left hand polarization is transmitted, is defined as:

$$DR_{circ} = 10 \log (P_R/P_L) \quad \text{Equation 2}$$

Where $P_R$ is the power received in the right-hand polarization channel and $P_L$ is the power received in the left-hand polarization channel.

The other preferred polarization, slanted, utilizes a radar system that can transmit linear polarization with the polarization plane tilted at 45° from the horizontal and can receive that 45° polarization state ($P_{45}$) in addition to its orthogonal component tilted at 135° from the horizontal ($P_{135}$). Here, the preferred linear depolarization ratio to be measured is defined as:

$$DR_{lin} = 10 \log (P_{135}/P_{45}). \quad \text{Equation 3}$$

Scattering calculations and actual measurements have been performed to estimate differences between DRs of spherical water droplets and various ice forms found in many clouds through which aircraft fly. It was found that the DR is also a function of radar elevation angle. As an example, $DR_{cicr}$, for columnar ice crystals and plate-like (planar) ice crystals would be zero if the signal was completely depolarized. It was found that at low elevation angles, between 0° and 30°, all of these ice crystals cause depolarization ratios of at least −27 dB. For spherical SLW drops however, $DR_{circ}$ would equal −∞ at all elevation angles for the theoretically perfect radar or approximately −35 dB for the ground-based radar tested by the inventors. A distinct difference in DR is obtained in this example, more specifically, a difference between −27 dB and −35 dB. Distinct differences in $DR_{lin}$ are also apparent. The greatest polarization ratios occur at the lowest elevation angle, which is the same pointing angle used by IHAS radar pointed ahead of the aircraft. Thus, a radar system that transmits a beam horizontally forward from the aircraft will optimally detect the differences in DR values obtained from SLW drops and ice crystals if circular or slanted linear polarization is used.

The following table summarizes the results of calculations from actual measurements from various hydrometeor types, and lists estimated depolarization ratios of both circular and slanted polarization states transmitted horizontally forward from an aircraft. Again, it should be noted that an ideal radar system would produce no return power in one of the channels, i.e., the cross-polarized channel, if the hydrometeor were spherical. However, in practice, all radar systems suffer from cross-talk between the two channels which introduces a small amount of unwanted power into the cross-polarized channel. The table indicates an actual signal return of approximately −35 dB reflected from spherical hydrometeors, i.e., SLW drops, as shown in column (1), measured in the above-noted tested radar system, and is representative of a likely limiting value.

|  | SLW Drops (1) | Plates (2) | Needles or Columns (3) | Graupel (4) | Aggregates (5) |
| --- | --- | --- | --- | --- | --- |
| Circular (Difference) | −35 dB | −10 dB (25 dB) | −17 dB or −27 dB (18 dB or 8 dB) | −30 dB (5 dB) | −25 dB (10 dB) |
| Slanted (Difference) | −35 dB | −10 dB (25 dB) | −15 dB or −25 dB (20 dB or 10 dB) | −30 dB (5 dB) | −25 dB (10 dB) |

The table also shows the approximate differences, given in parenthesis, between the approximate DR for SLW drops (−35 dB) and the DRs for the ice hydrometeors when circular or slanted polarization states are used. That is to say, the difference values are simply the DR values in columns (2), (3), (4), and (5), minus −35 dB. Since the precision of DR measurements is within approximately 1 dB, the depolarization values and the corresponding differences in the table are precise enough to accurately indicate the presence of hazardous SLW drops or non-hazardous ice hydrometeors. In essence, when the measured DR exceeds (is less negative than) approximately −32 dB, the presence of non-hazardous ice is indicated. Hence, the aircraft would be entering a non-hazardous zone. However, when the measured DR is less than (more negative) approximately −32 dB, and the temperature ahead of the aircraft is below 0° C., the presence of hazardous SLW is probable, and therefore, the aircraft should take avoidance measures. It should be noted that the values indicated above will change somewhat if other possible polarization states are applied.

SLW drops are especially hazardous when they are of drizzle size. The current weather warning radar systems are generally not sensitive enough to detect liquid drops of drizzle sizes and smaller while the instant inventive system is generally effective in the detection of drizzle. Of course, drizzle sizes occur across a large spectrum with rather fuzzy boundaries. At the small end, the sizes of drops that can be detected is dependent on the radar wavelength and the system sensitivity and ultimately on the power returned in the cross-polarization channel. On the large end of the spectrum, where the drizzle makes a transition to rain, the sphericity of the drizzle constantly decreases. This has an effect of a constant transition in the amount of power in the cross-polarization channel. Thus, for these larger sizes, some care and sophistication is needed in interpreting the depolarization ratio for the determination of the presence or non-presence of hazardous precipitation.

By processing the signals received in the co- and cross-polarized channels to determine the DR, and accounting for the air temperature measurement, the existence of hazardous SLW drops or non-hazardous ice crystals in the cloud ahead of the aircraft can be determined. The outside air temperature will be substantially equivalent to the temperature of the region ahead of the aircraft. If the aircraft is climbing or descending and the radar beam is not horizontal, a small temperature correction can be applied based on the well known moist adiabatic lapse rate. As previously discussed, this will allow the temperature of the hydrometeors sampled by IHAS 10 to be determined to within a few degrees centigrade which is sufficiently accurate to distinguish hazardous from non-hazardous conditions. The expected operating range of IHAS 10 is from about 100 meters to about 25 kilometers ahead of the aircraft. The measurement of DR as a function of range ahead of the aircraft will indicate the location of hazardous SLW drops along the flight path. Again, the extent and location of the region of SLW drops, and a determination of the need to change the flight path would be supplied to the pilot via display/indicator 36.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

We claim:

1. A weather hazard detecting radar system for determining the presence of supercooled liquid water droplets, comprising:

means for transmitting signals with a predetermined polarization;

means for receiving said signals, as reflected by hydrometeors in the atmosphere, those received signals including those being co-polarized with respect to said transmitted signals as well as those being cross-polarized with respect to said transmitted signals, said receiving means including an antenna and means following said antenna for separating said co-polarized signals and said cross-polarized signals into separate channels;

amplifier means, including means for inputting said co-polarized and cross-polarized signals from said separate channels and for converting said signals to a lower frequency, and further including an outputting means for said lower frequency signals;

temperature sensing means having a signal output;

processing means for inputting said lower frequency signals from said amplifier outputting means and said temperature sensing means output and for processing said signals according to a predetermined algorithm, said algorithm including means for determining the presence of supercooled liquid water droplets.

2. The radar system of claim 1 wherein said predetermined polarization is circular.

3. The radar system of claim 1 wherein said predetermined polarization is slanted.

4. The radar system of claim 3 wherein said slanted polarized signals are transmitted as linearly polarized signals that are slanted about 45 degrees from the horizontal.

5. The radar system of claim 1 wherein said means for transmitting signals transmits signals at an elevation angle approximately near the horizontal.

6. The radar system of claim 1 wherein said means for transmitting signals transmits signals in a vertical sector scanning mode.

7. The radar system of claim 1 wherein said means for transmitting signals transmits signals at frequencies within the Ka, X and W bands.

8. The radar system of claim 1 wherein said amplifier means includes two amplifiers, said inputting means includes two inputs, one for each amplifier, said outputting means includes two outputs, one for each amplifier, the input of one amplifier being connected to one channel with said copolarized signals, and the input of the other amplifier being connected to the other channel with said cross-polarized signals.

9. The radar system of claim 1 wherein said amplifier means is a single amplifier, said inputting means includes one input, said outputting means includes one output, said inputting means further including a means to switch between said separate channels.

10. The radar system of claim 1 wherein said processing means includes analog to digital converting means for converting said amplifier and temperature sensing analog signals to digital signals.

11. The method of determining the presence of supercooled liquid water droplets comprsing:

transmitting signals with a predetermined polarization;

receiving signals representing a portion of said transmitted signals;

separating said received signals that are co-polarized with respect to said transmitted signals from those that are cross-polarized with respect to said transmitted signals;

determining approximate ambient temperature and providing said determined temperature in electronic signal form;

processing both said co-polarized and cross-polarized signals to determine their relative power as well as said temperature signals and, from the values of those signals, determining the presence of supercooled liquid water.

12. The method of claim 11 wherein a processing determination that cross-polarized signal power is small with respect co-polarized signal power and that temperatures are within a given range indicates the presence of supercooled liquid water.

13. The method of claim 12 wherein said temperature range is about from −40 to about zero degrees centigrade to indicate the presence of supercooled liquid water.

* * * * *